US009852681B2

(12) United States Patent
Song

(10) Patent No.: US 9,852,681 B2
(45) Date of Patent: Dec. 26, 2017

(54) DATA STORAGE DEVICE FOR STORING COMPENSATION DATA AND DATA STORAGE METHOD FOR DISPLAY DEVICE

(71) Applicant: SAMSUNG DISPLAY CO., LTD., Yongin, Gyeonggi-Do (KR)

(72) Inventor: In Bok Song, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 112 days.

(21) Appl. No.: 14/700,081

(22) Filed: Apr. 29, 2015

(65) Prior Publication Data

US 2016/0189337 A1 Jun. 30, 2016

(30) Foreign Application Priority Data

Dec. 31, 2014 (KR) ........................ 10-2014-0195633

(51) Int. Cl.
*G06T 1/60* (2006.01)
*G09G 3/3208* (2016.01)
(Continued)

(52) U.S. Cl.
CPC ......... *G09G 3/3208* (2013.01); *G09G 3/2096* (2013.01); *G09G 5/39* (2013.01);
(Continued)

(58) Field of Classification Search
CPC ........................................................ G06T 1/60
See application file for complete search history.

(56) References Cited

U.S. PATENT DOCUMENTS 5,694,538 A * 12/1997 Okazaki .............. G06F 11/1433 714/15
6,769,053 B1 * 7/2004 De Jong ................... G06F 8/65 711/156

(Continued)

FOREIGN PATENT DOCUMENTS

| | | | |
|---|---|---|---|
| JP | 4058322 | B2 | 12/2007 |
| KR | 2003-0043691 | A | 6/2003 |

(Continued)

OTHER PUBLICATIONS

Patent Abstracts of Japan Publication No. JP 2004-127185, dated Apr. 22, 2004, for JP 4058322 B2, 1 page.

*Primary Examiner* — Barry Drennan
*Assistant Examiner* — Phong Nguyen
(74) *Attorney, Agent, or Firm* — Lewis Roca Rothgerber Christie LLP

(57) ABSTRACT

A data storage device to be coupled to a display device including a display unit including a plurality of blocks, each including a plurality of pixels, the data storage device including: a memory device to store a first address value and a second address value including information on a position of one of the plurality of blocks, store a first indication value to be utilized to determine whether the first address value is effective and a second indication value to be utilized to determine whether the second address value is effective, and store compensation data including information on the blocks; an effective address determinator to determine whether the first address value and the second address value are effective corresponding to the first indication value and the second indication value; and an updater to update the first and second indication values, the first and second address values, and the compensation data.

20 Claims, 10 Drawing Sheets

(51) Int. Cl.
*G09G 3/20* (2006.01)
*G09G 5/39* (2006.01)

(52) U.S. Cl.
CPC ... *G09G 2320/043* (2013.01); *G09G 2360/12* (2013.01); *G09G 2360/122* (2013.01)

(56) References Cited

U.S. PATENT DOCUMENTS 6,844,883 B2 * 1/2005 Bakhmutsky ........ G09G 3/3611 345/536
6,981,106 B1 * 12/2005 Bauman .............. G06F 12/0822 711/146
7,280,452 B2 * 10/2007 Lee ...................... G11B 27/034 369/53.18
7,538,306 B2 * 5/2009 Hente .................. G09G 3/3208 250/205
7,554,513 B2 * 6/2009 Sun ...................... G09G 3/3275 345/77
7,592,970 B2 * 9/2009 Matthies ............. G02F 1/13336 345/1.1
8,339,386 B2 * 12/2012 Leon ........................ G09G 3/30 345/207
8,350,495 B2 * 1/2013 Sulaiman ........... H05B 33/0854 315/158
8,379,034 B2 * 2/2013 Hwang .................... G09G 3/20 345/530
8,379,041 B2 * 2/2013 Chen ........................ G09G 3/20 345/204
8,514,179 B2 * 8/2013 Griffin ..................... H04B 1/38 345/169
2004/0138855 A1 * 7/2004 Chambers ................ G07C 1/02 702/183
2005/0188148 A1 * 8/2005 Osakabe .............. G11C 16/105 711/103
2006/0077136 A1 * 4/2006 Cok ..................... G09G 3/3216 345/76
2009/0313453 A1 * 12/2009 Stefanus ............. G06F 11/1441 711/210
2010/0053185 A1 * 3/2010 Hwang ................ G09G 3/2055 345/556
2011/0128311 A1 * 6/2011 Wakatsuki ............... G09G 3/22 345/691
2012/0133835 A1 * 5/2012 Van Heesch ............. G09G 5/00 348/576
2015/0116341 A1 * 4/2015 Kenmochi ............... G09G 3/20 345/536
2016/0162356 A1 * 6/2016 Singhai ................ G11C 29/765 714/766
2016/0314557 A1 * 10/2016 Croxford .................. G06T 1/60

FOREIGN PATENT DOCUMENTS

KR 10-2005-0069925 A 7/2005
KR 10-2013-0091377 A 8/2013

* cited by examiner

FIG. 5

| FIRST INDICATION VALUE (FLD1) | SECOND INDICATION VALUE (FLD2) | EFFECTIVE ADDRESS |
|---|---|---|
| 0 | 0 | INITIAL ADDRESS VALUE (ADD ini) |
| 1 | 0 | FIRST ADDRESS VALUE (ADD1) |
| 0 | 1 | SECOND ADDRESS VALUE (ADD2) |
| 1 | 1 | FIRST ADDRESS VALUE (ADD1) |

FIG. 10

| FIRST INDICATION VALUE (FLD1) | SECOND INDICATION VALUE (FLD2) | THIRD INDICATION VALUE (FLD3) | EFFECTIVE ADDRESS |
|---|---|---|---|
| 0 | 0 | 0 | INITIAL ADDRESS VALUE (ADD ini) |
| 1 | 0 | 0 | FIRST ADDRESS VALUE (ADD1) |
| 1 | 0 | 1 | FIRST ADDRESS VALUE (ADD1) |
| 1 | 1 | 0 | FIRST ADDRESS VALUE (ADD1) |
| 1 | 1 | 1 | FIRST ADDRESS VALUE (ADD1) |
| 0 | 1 | 0 | SECOND ADDRESS VALUE (ADD2) |
| 0 | 1 | 1 | SECOND ADDRESS VALUE (ADD2) |
| 0 | 0 | 1 | THIRD ADDRESS VALUE (ADD3) |

DATA STORAGE DEVICE FOR STORING COMPENSATION DATA AND DATA STORAGE METHOD FOR DISPLAY DEVICE

CROSS-REFERENCE TO RELATED APPLICATION

This application claims priority to and the benefit of Korean Patent Application No. 10-2014-0195633, filed on Dec. 31, 2014 in the Korean Intellectual Property Office, the disclosure of which is incorporated herein in its entirety by reference.

BACKGROUND

1. Field

The present invention relates to a data storage device and a data storage method for a display device.

2. Description of the Prior Art

With the development of multimedia, the importance of a display device has been increased. To cope with this, various kinds of display devices, such as a liquid crystal display (LCD) and an organic electroluminescent display, have been used.

Among them, the organic electroluminescent display is a display device that emits light through an electrical excitation of phosphorus organic compounds, and can express an image through voltage programming or current programming of a plurality of organic light emitting diodes (OLEDs) that are arranged in a matrix form. The organic electroluminescent display that is driven as described above is classified into a passive matrix type and an active matrix type that uses thin film transistors. The passive matrix type operates in a manner that anodes and cathodes of OLEDs are formed to cross and lines are selected to drive the OLEDs, whereas the active matrix type operates in a manner that thin film transistors are connected to respective indium tin oxide (ITO) pixel electrodes and OLEDs are driven in accordance with voltages that are maintained by the capacitance of capacitors connected to gates of the thin film transistors.

However, the organic electroluminescent display as described above may be unable to display an image with desired luminance due to efficiency changes that are caused by deterioration of the OLEDs. In practice, as time goes by, the OLEDs are deteriorated to generate light with gradually lowered luminance with respect to the same data signal.

The above information disclosed in this Background section is only for enhancement of understanding of the background of the present invention, and therefore, it may contain information that does not form prior art.

SUMMARY

Accordingly, a separate unit may be used to compensate for the decrease of the luminance due to the deterioration of the OLEDs. Further, on the assumption that such a separate unit operates, gray level information may be stored for regions of an image that is input to the organic electroluminescent display. In addition to the compensation for the luminance decrease, the gray level information may be stored for the regions of the input image so as to compensate for damage of the display device due to accumulated stress or the like.

Further, the operation of the display device may abnormally end due to an abrupt interruption of power supply, especially in the case of a display device that is mounted on a portable terminal. Nevertheless, it may be desirable that the gray level information for regions of an image that is provided to the display device is accumulated and stored for a long time without error occurrence.

Accordingly, one or more embodiments of the present invention provide a data storage device for a display device, which may determine to what extent correct data is stored before an abnormal end of the operation of the display device in spite of such an abnormal end.

One or more embodiments of the present invention provide a data storage method for a display device, which may determine to what extent correct data is stored before an abnormal end of the operation of the display device in spite of such an abnormal end.

Additional aspects, subjects, and features of the invention will be set forth in part in the description which follows and in part will become apparent to those having ordinary skill in the art upon examination of the following or may be learned from practice of the invention.

According to an aspect of an embodiment of the present invention, there is provided a data storage device to be coupled to a display device. The display device includes a display unit including a plurality of blocks, each of the blocks including a plurality of pixels. The data storage device includes: a memory device configured to store a first address value and a second address value including information on a position of one of the plurality of blocks, to store a first indication value to be utilized to determine whether the first address value is effective and a second indication value to be utilized to determine whether the second address value is effective, and to store compensation data including information on the blocks; an effective address determinator configured to determine whether the first address value and the second address value are effective corresponding to the first indication value and the second indication value; and an updater configured to update the first and second indication values, the first and second address values, and the compensation data.

The effective address determinator may be configured to: determine that the first address value is effective when the first indication value has a first value; determine that the second address value is effective when the first indication value has a second value and the second indication value has a third value; and determine that both the first and second address values are not effective when the first indication value has the second value and the second indication value has a fourth value.

The effective address determinator may be configured to determine that a predetermined initial address value is effective when both the first and second address values are determined to be not effective.

The initial address value may be configured to be updated during a predetermined period.

The updater may be configured to set the first indication value to one of the first value and the second value, and to set the second indication value to one of the third value and the fourth value.

The first value may be equal to the third value, and the second value may be equal to the fourth value.

The memory device may include a nonvolatile memory.

The updater may include: a first sub-updater configured to update the compensation data; and a second sub-updater configured to update the first and second indication values and the first and second address values.

The memory device may include: a first storage device configured to store the compensation data; and a second storage device configured to store the first and second indication values and the first and second address values.

The first storage device may include a memory that is physically separated from the second storage device.

The memory device may be configured to update and store the first and second indication values and the first and second address values, and to accumulate and store the compensation data.

The updated first address value may correspond to a next block to a block that corresponds to a previous first address value, and the updated second address value may correspond to a next block to a block that corresponds to a previous second address value.

The updated first address value and the updated second address value may correspond to a same block.

The memory device may be further configured to store a third address value that may include information on a position of one of the plurality of blocks, and a third indication value to be utilized to determine whether the third address value is effective, and the effective address determinator may be configured to determine whether the first to third address values are effective corresponding to the first to third indication values.

According to another aspect of an example embodiment of the present invention, a data storage method for a display device includes: determining whether a first address value or a second address value are effective corresponding to a first indication value and a second indication value, respectively; in response to determining that the first address value is effective, updating the first indication value, the first address value, and compensation data of a corresponding block, and then updating the second indication value and the second address value; and in response to determining that the second address value is effective, updating the second indication value, the second address value, and compensation data of a corresponding block, and then updating the first indication value and the first address value.

The method may further include: in response to determining that both the first address value and the second address value are not effective, updating the first indication value, the first address value, and compensation data of a block that corresponds to a predetermined initial address value, and then updating the second indication value and the second address value.

The method may further include updating the initial address value in a predetermined period.

The updating of the first indication value, the first address value, and the compensation data of the corresponding block, and then the updating of the second indication value and the second address value may include: initializing values stored as the first indication value and the first address value; initializing the compensation data of the block that corresponds to the first address value; storing updated compensation data of the block that corresponds to the first address value; storing updated values as the first indication value and the first address value; initializing values stored as the second indication value and the second address value; and storing updated values as the second indication value and the second address value.

The storing of the updated values as the first indication value and the first address value may correspond to a next block to the block that corresponds to the first address value before being updated, and the storing of the updated value as the second indication value and the second address value may correspond to a next block to the block that corresponds to the second address value before being updated.

The updated first address value and the updated second address value may correspond to a same block.

Accordingly, in spite of the abnormal end of the operation of the display device, it may be possible to determine to what extent the correct data is stored before the abnormal end of the operation of the display device.

The aspects and features according to the present invention are not limited to the contents as exemplified above, but more various aspects and features are described in the specification of the present invention.

BRIEF DESCRIPTION OF THE DRAWINGS

The above and other aspects and features of the present invention will be more apparent from the following detailed description taken in conjunction with the accompanying drawings, in which:

FIG. 5 is a table showing first and second indication values and an effective address value determined accordingly according to some embodiments of the present invention;

FIG. 10 is a table showing first to third indication values and an effective address value determined accordingly according to some embodiments of the present invention.

DETAILED DESCRIPTION

Figure 1:
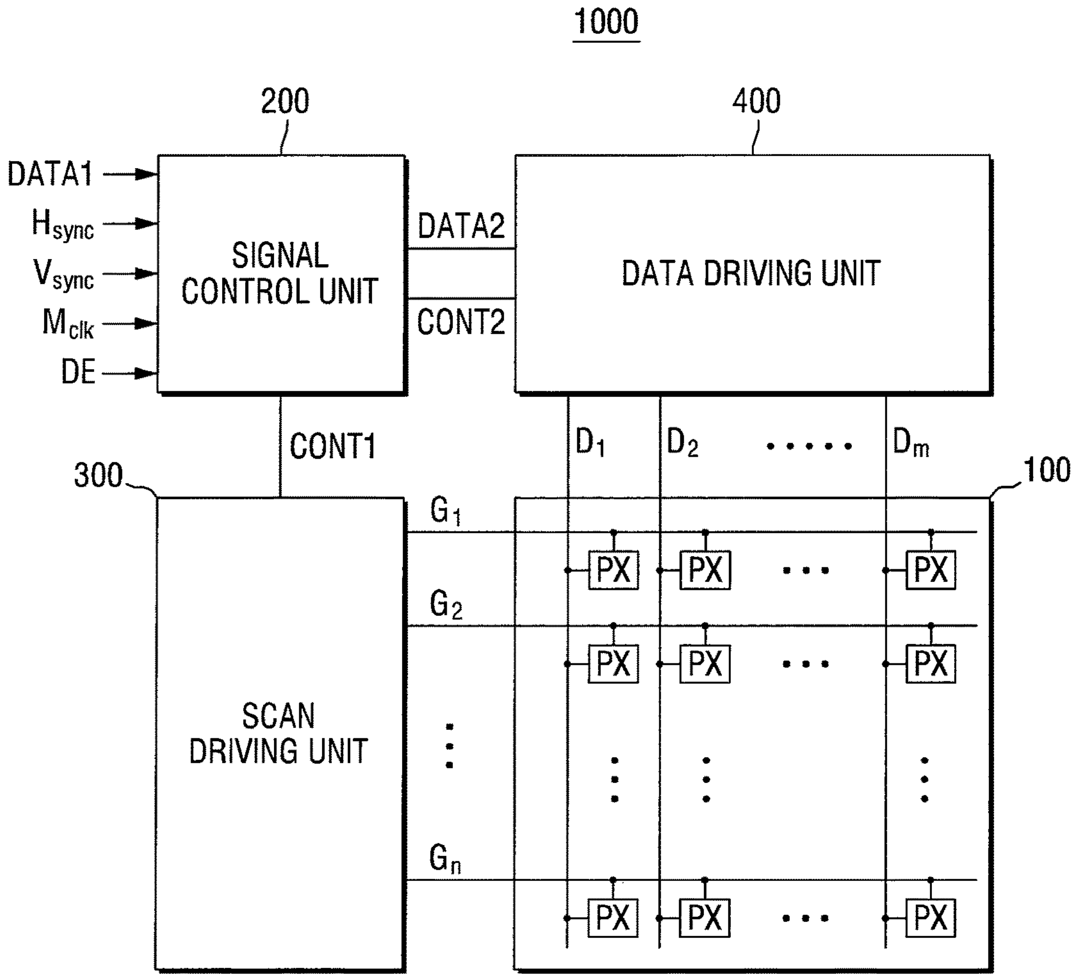
FIG. 1 is a schematic diagram of a display device according to an embodiment of the present invention.

Example embodiments of the present invention will now be described more fully hereinafter with reference to the accompanying drawings, in which example embodiments of the invention are shown. This invention may, however, be embodied in various different forms and should not be construed as limited to the embodiments set forth herein. Rather, these embodiments are provided so that this disclosure will be thorough and complete, and will filly convey the spirit and scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are used to distinguish one element from another element. Thus, a first element discussed below could be termed a second element without departing from the spirit and scope of the invention.

The terminology used herein is for the purpose of describing particular embodiments only and is not intended to be limiting. As used herein, the singular forms "a" and "an" are intended to include the plural forms, including "at least one," unless the content clearly indicates otherwise. Expressions such as "at least one of," when preceding a list of elements, modify the entire list of elements and do not modify the individual elements of the list. "Or" means "and/or." As used herein, the term "and/or" includes any and all combinations of one or more of the associated listed items. It will be further understood that the terms "comprises," "comprising," "includes," and "including," when used in this specification, specify the presence of the stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein should be interpreted accordingly.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, example embodiments of the present invention will be described in detail with reference to the accompanying drawings.

FIG. 1 is a schematic diagram of a display device according to an embodiment of the present invention.

Referring to FIG. 1, a display device 1000 includes a signal control unit (e.g., a signal controller) 200, a data driving unit (e.g., a data driver) 400, a gate driving unit (e.g., a gate driver) 300, and a pixel unit (e.g., a display unit or a display area) 100.

The pixel unit 100 may include a plurality of gate lines G1 to Gn, a plurality of data lines D1 to Dm, and a plurality of pixels PX. The plurality of gate lines G1 to Gn may transfer gate signals to the pixels PX, and the plurality of data lines D1 to Dm may transfer data signals to the pixels PX. The plurality of pixels PX may be located at crossing regions of the plurality of gate lines G1 to Gn and the plurality of data lines D1 to Dm.

Each of the pixels PX may include an organic light emitting diode (OLED) or a plurality of organic light emitting diodes. In some embodiments, in the case of displaying a color through a spatial sum in order to implement a color display, a red pixel, a green pixel, and a blue pixel may be alternately arranged in a row direction or in a column direction, or three pixels may be arranged in positions that correspond to three vertices of a triangle.

The signal control unit 200 may receive various kinds of signals from an outside thereof, and may control the gate driving unit 300 and the data driving unit 400. For example, the signal control unit 200 may receive first video data DATA1 input from the outside and input control signals for controlling a display of the first video data DATA1, and may output a gate driving unit control signal (e.g., a gate driver control signal) CONT1, a data driving unit control signal (e.g., a data driver control signal) CONT2, and second video data DATA2.

The first video data DATA1 may include luminance information of the pixels PX of the pixel unit 100, and the luminance may have a number of gray levels (e.g., a predetermined number of gray levels), for example, 1024 ($=2^{10}$), 256 ($=2^{8}$), or 64 ($=2^{6}$) gray levels, but is not limited thereto. The luminance may have a different number of gray levels. Further, the first video data DATA1 may be divided in the unit of a frame.

Examples of the input control signals that are transferred to the signal control unit 200 may be a vertical sync signal Vsync, a horizontal sync signal Hsync, a main clock Mclk, and a data enable signal DE, but are not limited thereto. The input control signals may include other kinds of signals.

The gate driving unit control signal CONT1 may be an operation control signal of the gate driving unit 300, which is generated by the signal control unit 200 and is transferred to the gate driving unit 300. The gate driving unit control signal CONT1 may include a scan start signal and a clock signal, but is not limited thereto. The gate driving unit control signal CONT1 may further include other kinds of signals.

The data driving unit control signal CONT2 may be an operation control signal of the data driving unit 400, which is generated by the signal control unit 200 and is transferred to the data driving unit 400.

The signal control unit 200 may process the first video data DATA1 input thereto to match the operation condition of the data driving unit 400 based on the input control signal. That is, the signal control unit 200 may generate and output the second video data DATA2 through video processing, such as luminance compensation, with respect to the first video data DATA1. The signal control unit 200 may compensate for the deterioration of the organic electroluminescent display, perform other works for improvement of the characteristics of picture quality, and/or arrange the data order of the input first video data DATA1, so that the data driving unit 400 may operate. In addition, the signal control unit 200 may further perform other data processes as would be known to those skilled in the art. The details thereof will be described later with reference to FIG. 2.

The gate driving unit 300 may be connected to the pixel unit 100 through the plurality of gate lines G1 to Gn. The gate driving unit 300 may generate a plurality of gate signals that may activate respective pixels PX of the pixel unit 100 according to the gate driving unit control signal CONT1. The gate driving unit 300 may transfer the generated gate signals to the corresponding gate lines among the plurality of gate lines G1 to Gn.

The data driving unit 400 may be mounted on the pixel unit 100 through a contact pad as an integrated circuit (IC), or may be connected to the pixel unit 100 in the form of a tape carrier package (TCP).

Figure 2:
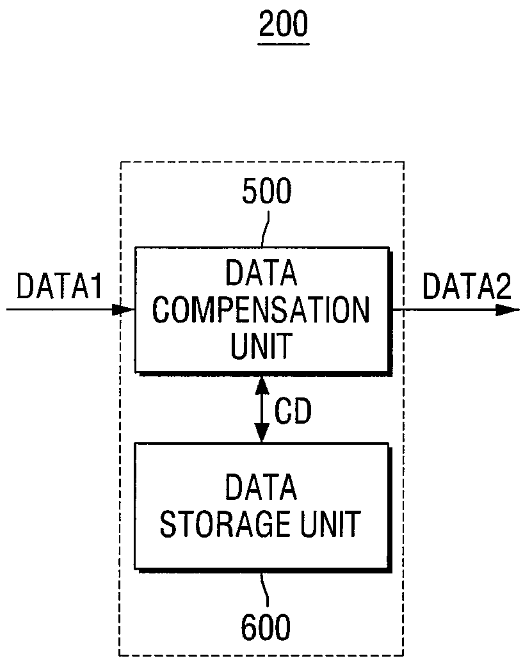
FIG. 2 is a block diagram of a signal control unit according to an embodiment of the present invention.

FIG. 2 is a block diagram of a signal control unit according to an embodiment of the present invention.

Referring to FIG. 2, the signal control unit 200 may include a data compensation unit (e.g., a data compensator) 500 and a data storage unit (e.g., a data storage device) 600.

The data compensation unit 500 may receive the first video data DATA1 that is provided from an external host and may output the second video data DATA2. Specifically, the first video data DATA1 may be provided from the external host, and may contain gray level information for respective pixels PX of an image to be displayed. The second video data DATA2 may correspond to a final output signal after the deterioration of the organic electroluminescent display is compensated for and/or other processes are performed, and may be calculated on the basis of the first video data DATA1. However, the data compensation unit 500 is not limited thereto, and may include, for example, a unit that performs all kinds of known video data processes, of which the detailed explanation will be omitted.

The data storage unit 600 may store various kinds of information for the operation of the data compensation unit 500. In particular, the data storage unit 600 may store compensation data CD for compensating for the deterioration of the organic electroluminescent display, and the compensation data CD may include gray level information for respective pixels PX of an image to be displayed, which is included in the first video data DATA1.

Further, as illustrated, the data storage unit 600 may be formed in the signal control unit 200, but is not limited thereto. For example, the data storage unit 600 may be mounted or formed on another region of the organic electroluminescent display. Further, the data storage unit 600 may be arranged in the form of a separate external storage device that is positioned outside (e.g., external to the display device), and may be connected to the data compensation unit 500 to provide information to the data compensation unit 500.

Figure 3:
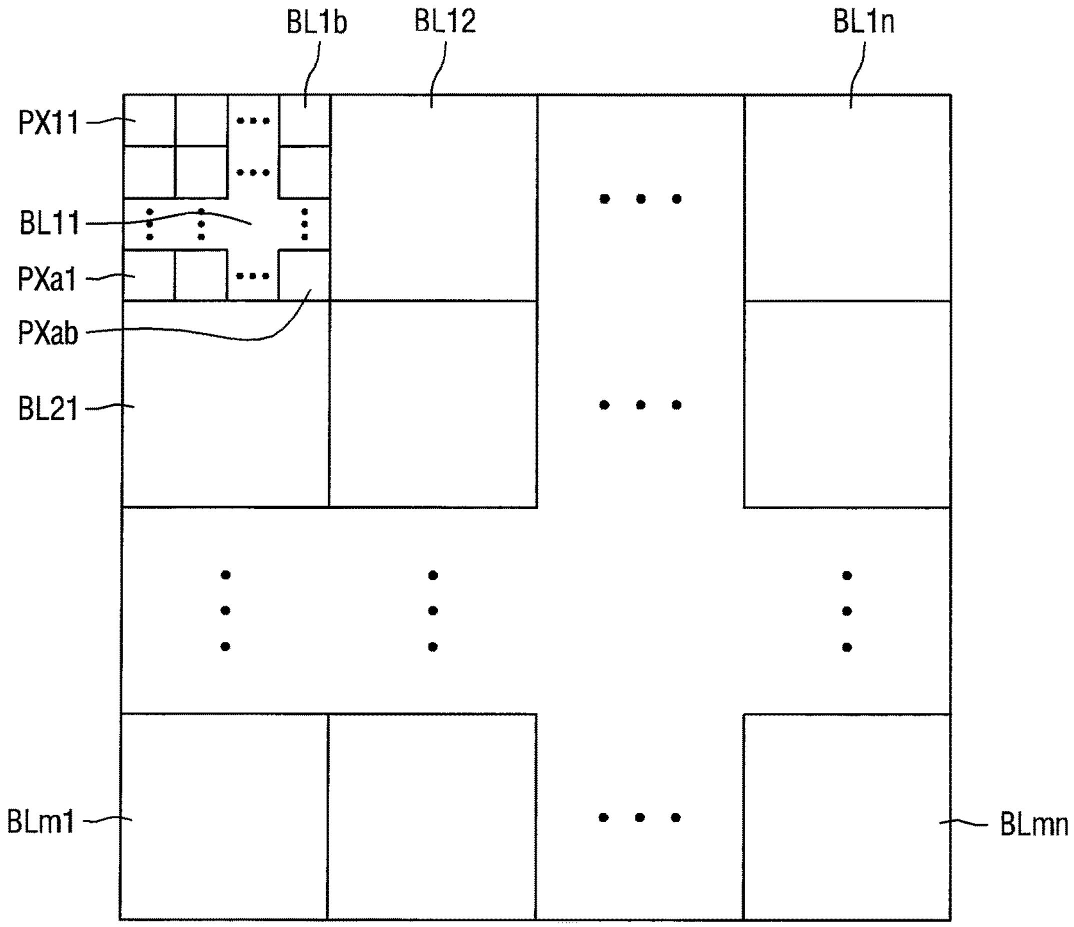
FIG. 3 is a schematic diagram of one frame according to an embodiment of the present invention.

FIG. 3 is a schematic diagram of one frame according to an embodiment of the present invention.

A completed organic electroluminescent display may display an image corresponding to the first video data DATA1 that is provided from the external host, and the image may be generated through successive reproduction of a plurality of frames. One of the plurality of frames that constitute the image is exemplarily illustrated.

Referring to FIG. 3, one frame may include a plurality of blocks BL11 to BLmn. Further, each of the blocks BL11 to BLmn may include a plurality of pixels PX11 to PXab. FIG. 3 exemplarily illustrates a frame in which m blocks are arranged in a vertical direction and n blocks are arranged in a horizontal direction. That is, one frame may include the first row and first column block BL11 to the m-th row and n-th column block BLmn, and each block may include the plurality of pixels PX11 to PXab.

In this case, each of the blocks BL11 to BLmn may be the minimum unit of information that is stored in the data storage unit 600. Specifically, due to the problem of capacity, the data storage unit 600 may be unable to contain gray level information of all frames and all pixels. If gray level information of all frames and all pixels is stored, all input images may be stored as they are, which may cause inefficiency. Accordingly, by allocating a plurality of pixels into a block, and by storing and managing information on the amount of accumulated deterioration in the unit of a block, the required capacity of the data storage unit 600 may be decreased.

However, since the data storage unit 600 extracts, accumulates, and stores compensation data CD based on all input video data, it may collect the compensation data CD for a long term. In this case, if an abnormal power interruption occurs during storing of the compensation data CD in the data storage unit 600, a method that may secure reliability of the compensation data CD that is accumulated and stored may be desired. That is, when a normal power is applied again, it may be desired to determine whether the position of the block that corresponds to the finally stored compensation data CD or the compensation data CD of the corresponding block has been correctly stored. Hereinafter, the configuration of the data storage unit 600 and the method thereof for securing the reliability of the compensation data CD will be described.

Figure 4:
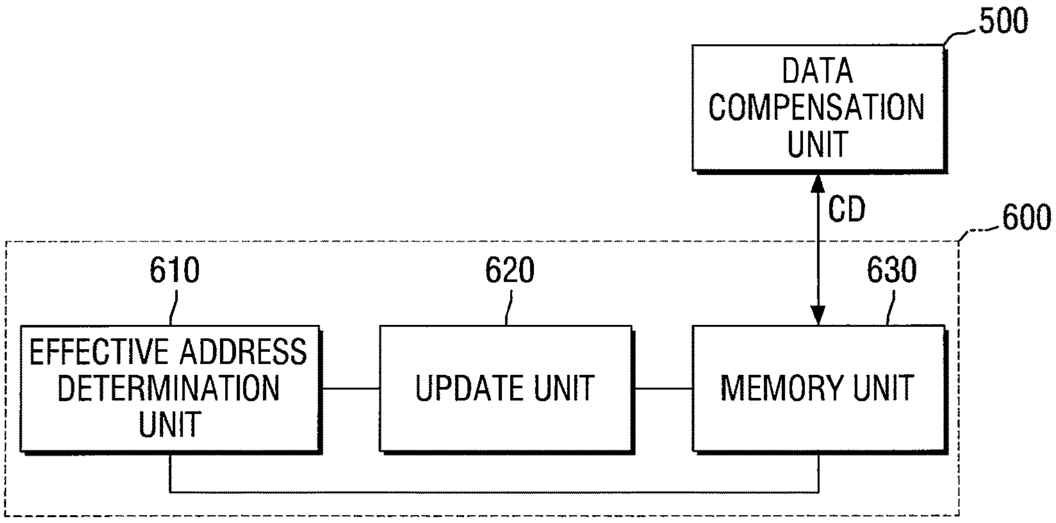
FIG. 4 is a block diagram of a data storage unit according to an embodiment of the present invention.

FIG. 4 is a block diagram of a data storage unit according to an embodiment of the present invention.

Referring to FIG. 4, the data storage unit 600 may include a memory unit (e.g., a memory device) 630, an effective address determination unit (e.g., an effective address determinator) 610, and an update unit (e.g., an updater) 620.

The memory unit 630 may store compensation data CD, a first address value ADD1, a second address value ADD2, a first indication value FLD1, and a second indication value FLD2. In particular, the memory unit 630 may send and receive the compensation data CD with the data compensation unit 500 that is another unit in the signal control unit 200.

The compensation data CD may include gray level information of respective pixels included in the pixel unit 100. The compensation data CD may be accumulated and stored. That is, gray level information of respective blocks of a plurality of successive frames may be accumulated and stored.

The first address value ADD1 may correspond to any one of the blocks included in the pixel unit 100 to indicate the position thereof, and the second address value ADD2 may correspond to any one of the blocks included in the pixels unit 100 to indicate the position thereof. It is not necessary that the blocks indicated by the first address value ADD1 and the second address value ADD2 are different from each other, for example, it may be desired that the blocks indicated by the first address value ADD1 and the second address value ADD2 are the same. This will be described in more detail later.

The first indication value FLD1 and the second indication value FLD2 may be used to determine whether the first address value ADD1 and the second address value ADD2 are effective. If the first indication value FLD1 has a first value, it may be determined that the first address value ADD1 is effective. Further, if the first indication value FLD1 has a second value and the second indication value FLD2 has a third value, it may be determined that the second address value ADD2 is effective. Further, if the first indication value FLD1 has the second value and the second indication value FLD2 has a fourth value, it may be determined that both the first address value ADD1 and the second address value ADD2 are not effective. If it is determined that both the first address value ADD1 and the second address value ADD2 are not effective, it may be determined that a predetermined initial address value ADDini is effective.

This will be described in detail with reference to FIG. 5.

FIG. 5 is a table showing first and second indication values and an effective address value determined accordingly according to some embodiments of the present invention.

FIG. 5 exemplarily illustrates that first and third values are “1”, and second and fourth values are “0”.

Referring to FIG. 5, in the case where the first indication value FLD1 is “1”, it may be determined that the first address value ADD1 is effective. Further, in the case where the first indication value FLD1 is “0”, it may be determined that the first address value ADD1 is not effective, and thus it may be necessary to determine which one of the second address value ADD2 and the initial address value ADDini is effective. In this case, whether the second address value ADD2 is effective may be determined on the basis of the second indication value FLD2. That is, if the second indication value FLD2 is “1” in a state where the first address value ADD1 is not effective, it may be determined that the second address value ADD2 is an effective address value. If the second indication value FLD2 is “0”, it may be determined that both the first address value ADD1 and the second address value ADD2 are not effective, but the initial address value ADDini is effective.

Referring again to FIG. 4, the data storage unit 600 may include the effective address determination unit 610 and the update unit 620 in addition to the memory unit 630.

The effective address determination unit 610 may determine whether the first address value ADD1 and the second address value ADD2 are effective based on the first indication value FLD1 and the second indication value FLD2. Specifically, the effective address determination unit 610 may determine whether the first address value ADD1 and the second address value ADD2 that are currently stored in the memory unit 630 are effective based on the first indication value FLD1 and the second indication value FLD2 that are stored in the memory unit 630, and may provide the result of the determination to the update unit 620.

The effective address determination unit 610 may be arranged in the signal control unit 200 as a separate unit, but is not limited thereto. For example, the effective address determination unit 610 may be programmed in an existing arithmetic logic unit in the signal control unit 200. Further, the effective address determination unit 610 is not limited to be arranged in the signal control unit 200, but may be arranged outside thereof as a separate unit.

The update unit 620 may update the first indication value FLD1, the second indication value FLD2, the first address value ADD1, and the second address value ADD2 according to the result of the determination through the effective address determination unit 610 to provide the updated values to the memory unit 630.

The update unit 620 may be arranged in the signal control unit 200 as a separate unit, but is not limited thereto. For example, the update unit 620 may be programmed in an existing arithmetic logic unit in the signal control unit 200. Further, the update unit 620 is not limited to be arranged in the signal control unit 200, but may be arranged outside thereof as a separate unit.

The effective address determination unit 610 and the update unit 620 may determine whether the first address value ADD1 and the second address value ADD2 are effective as described above with reference to FIG. 4. This will be described in more detail with reference to FIG. 6.

Figure 6:
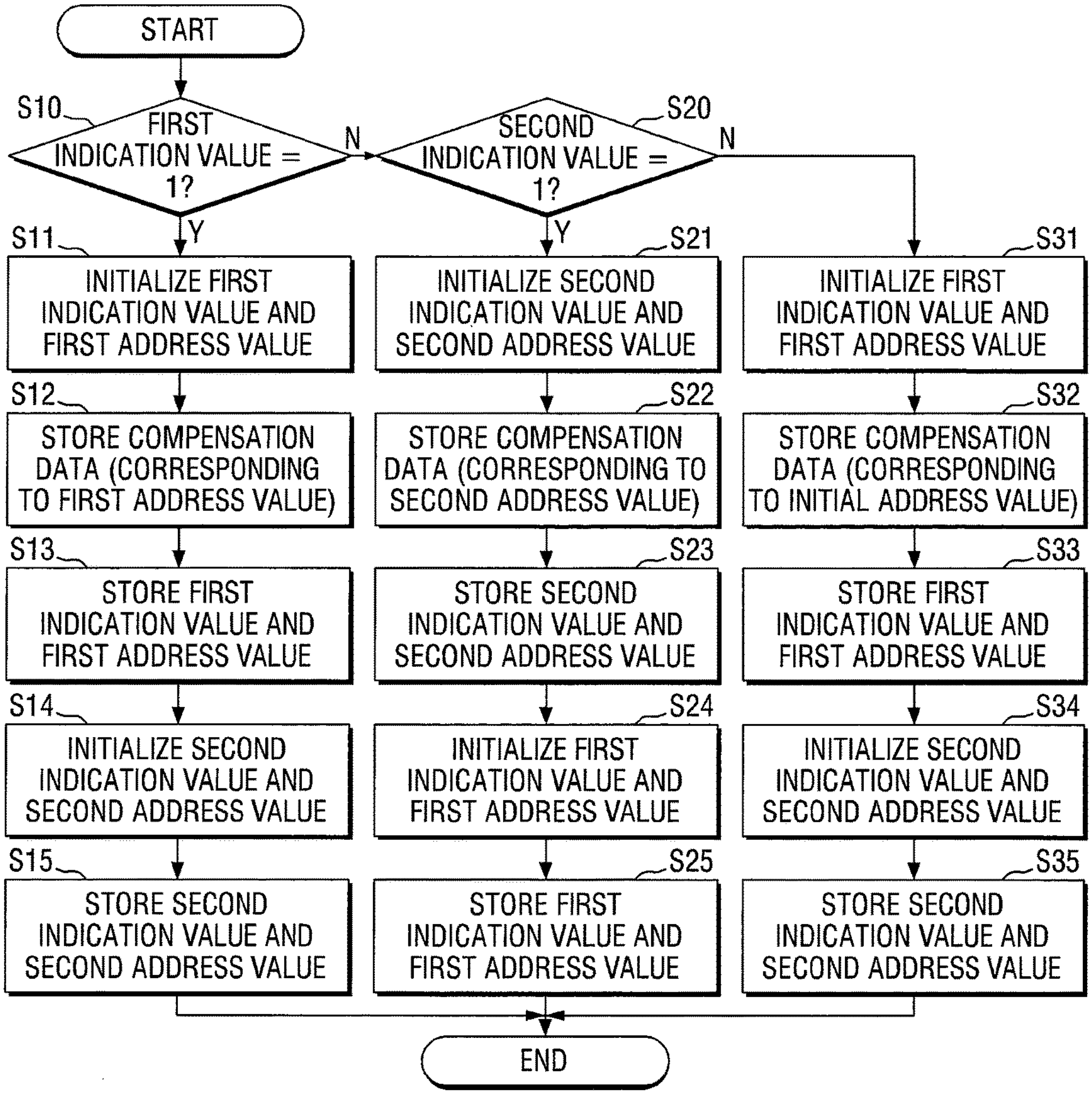
FIG. 6 is a flowchart of a data storage method according to an embodiment of the present invention.

FIG. 6 is a flowchart of a data storage method according to an embodiment of the present invention.

Referring to FIG. 6, it may be first confirmed whether the first indication value FLD1 is “1” (S10). According to the first indication value FLD1 as described above, it may be determined whether the first address value ADD1 is effective, and in the drawing, it is exemplarily illustrated that the first indication value FLD1 is “1” in the case where the first address value ADD1 is effective. Further, confirmation of whether the first indication value FLD1 is “1” may be performed by the effective address determination unit 610.

If the first indication value FLD1 is “1”, the first address value ADD1 that is stored in the memory unit 630 is effective, and processes (S11 to S15) of storing the compensation data CD for the block that corresponds to the first address value ADD1 may be subsequently performed. Specifically, before the compensation data CD for the block that corresponds to the first address value ADD1 is updated, the first indication value FLD1 may be set to “0”, and the first address value ADD1 may be set to an arbitrary value (S11). In this case, the value that is currently stored as the first address value ADD1 may be used to update the compensation data CD, and thus, may be temporarily stored in another storage region.

If the first indication value FLD1 and the first address value ADD1 are initialized to “0” (S11), the compensation data CD for the block that corresponds to the stored first address value ADD1 may be provided and stored in the memory unit 630 (S12). In this case, since it is desired that the memory unit 630, in which the first indication value FLD1, the second address value ADD2, and the compensation data CD are stored, does not lose the information that is stored therein even in a power interruption state, the memory unit 630 may be a nonvolatile storage device. After the storage of the compensation data CD is completed, the compensation data CD is correctly stored, and thus, suitable values may be stored again as the first indication value FLD1 and the first address value ADD1 (S13). In this case, since the compensation data CD is correctly stored, a “1” may be stored as the first indication value FLD1, and the first address value ADD1 may be set to include position information that corresponds to a next block (e.g., a next adjacent block) to the block that corresponds to the compensation data CD that was just previously stored.

Thereafter, the second indication value FLD2 and the second address value ADD2 may be initialized (S14). In this case, the second indication value FLD2 and the second address value ADD2 may be set to "0".

After the initialization (S14) of the second indication value FLD2 and the second address value ADD2 is completed, the second indication value FLD2 and the second address value ADD2 may be stored (S15). Specifically, the second address value ADD2 may be set to indicate the next block (e.g., next adjacent block) to the block that corresponds to the compensation data CD that was just previously stored in the memory unit 630, and since the second address value ADD2 is correctly set, the second indication value FLD2 may be set to "1".

The process of updating the first and second indication values FLD1 and FLD2, the first and second address values ADD1 and ADD2, and the compensation data CD may be performed through mutual operations of the update unit 620 and the memory unit 630.

The second address value ADD2 may be equal to the first address value ADD1. Since the second address value ADD2 operates as a kind of backup of the first address value ADD1, the first address value ADD1 and the second address value ADD2 may be equal to each other.

It is not necessary that the first and second indication values FLD1 and FLD2 and the first and second address values ADD1 and ADD2 are accumulated and stored, unlike the compensation data CD, and thus, small capacity may be allocated and used.

In the case where an abnormal end of the operation of the display device due to an abrupt power interruption does not occur, the above-described processes may be repeated, and the compensation data CD may be accumulated and stored in the memory unit 630.

On the other hand, if the power is normally connected again in a state where the operation of the display device is abnormally ended due to an abrupt power interruption during the storing of the compensation data CD, at least one of the first indication value FLD1 and the second indication value FLD2 may be "0".

For example, if the power is supplied again in a state where the power interruption occurs during the storing of the compensation data CD for the block that corresponds to the first address value ADD1 (S13), the first indication value FLD1 and the second address value ADD2 are in an initialization state, and the first indication value FLD1 and the second address value ADD2 may be "0". In this case, the first address value ADD1 is unreliable, and thus, the second address value ADD2 may be used.

Specifically, if the first indication value FLD1 is "0", it may be determined that the first address value ADD1 is not effective (S10), and then a process of confirming whether the second indication value FLD2 is effective may be performed (S20). This process may be performed by the effective address determination unit 610.

If the second indication value FLD2 is "1", the second address value ADD2 that is stored in the memory unit 630 is effective, and then a process of storing the compensation data CD for the block that corresponds to the second address value ADD2 may be subsequently performed (S21 to S25). Accordingly, although the first address value ADD1 does not indicate a correct value, the position of the block, in which correct compensation data CD was just previously stored, can be confirmed by the second address value ADD2, and the compensation data CD can be updated.

Specifically, before the compensation data CD for the block that corresponds to the second address value ADD2 is updated, the second indication value FLD2 and the second address value ADD2 may be set to "0" (S21). In this case, the value that is currently stored as the second address value ADD2 may be used to update the compensation data CD, and thus, may be temporarily stored in another storage region.

If the second indication value FLD2 and the second address value ADD2 are initialized to "0" (S21), the compensation data CD for the block that corresponds to the stored second address value ADD2 may be provided and stored in the memory unit 630 (S22). In this case, since it is desired that the memory unit 630, in which the second indication value FLD2, the second address value ADD2, and the compensation data CD are stored, does not lose the information that is stored therein even in a power interruption state, the memory unit 630 may be a nonvolatile storage device. After the storage of the compensation data CD is completed, the compensation data CD is correctly stored, and thus, suitable values may be stored again as the second indication value FLD2 and the second address value ADD2 (S23). In this case, since the compensation data CD is correctly stored, a "1" may be stored as the second indication value FLD2, and the second address value ADD2 may be set to include position information that corresponds to a next block (e.g., a next adjacent block) to the block that corresponds to the compensation data CD that was just previously stored.

Thereafter, the first indication value FLD1 and the first address value ADD1 may be initialized (S24). In this case, the first indication value FLD1 and the first address value ADD1 may be set to "0".

After the initialization (S24) of the first indication value FLD1 and the first address value ADD1 is completed, the first indication value FLD1 and the first address value ADD1 may be stored (S25). Specifically, the first address value ADD1 may be set to indicate the next block to the block that corresponds to the compensation data CD that was just previously stored in the memory unit 630, and since the first address value ADD1 is correctly set, the first indication value FLD1 may be set to "1".

The process of updating the first and second indication values FLD1 and FLD2, the first and second address values ADD1 and ADD2, and the compensation data CD may be performed through mutual operations of the update unit 620 and the memory unit 630. Further, the first address value ADD1 and the second address value ADD2 may be equal to each other as described above.

On the other hand, if it is determined that both the first address value ADD1 and the second address value ADD2 are not effective, the process may cause a problem. In the case where it is determined that both the first address value ADD1 and the second address value ADD2 are not effective, both the first indication value FLD1 and the second indication value FLD2 may be "0". For example, this may correspond to a case where the operation of the display device is abnormally ended again during the storing of the compensation data CD corresponding to the second address value ADD2.

In this case, a process of confirming whether both the first indication value FLD1 and the second indication value FLD2 are "1" may be performed (S10 and S20), and after both the first indication value FLD1 and the second indication value FLD2 are determined to be "0", the compensation data CD corresponding to the predetermined initial address value ADDini may be stored.

Specifically, if it is determined that both the first indication value FLD1 and the second indication value FLD2 are "0" (S10 and S20), the first indication value FLD1 and the first address value ADD1 may be first initialized (S31).

After both the first indication value FLD1 and the first address value ADD1 are set to "0", the compensation data CD for the block that corresponds to the predetermined initial address value ADDini may be stored in the memory unit 630.

After the storing of the compensation data CD is completed, new values may be stored as the first indication value FLD1 and the first address value ADD1 (S33). In this case, the first address value ADD1 may be set to contain the information on the address of the next block to the block that corresponds to the initial address value ADDini, and since the first address value ADD1 is correctly set, the first address value ADD1 may also be set to "1".

After the second indication value FLD2 and the second address value ADD2 are initialized (S34), new values may be stored as the second indication value FLD2 and the second address value ADD2 (S35). In this case, the second address value ADD2 may also be set to contain the information on the address of the next block to the block that corresponds to the initial address value ADDini, and since the second address value ADD2 is correctly set again, the second address value ADD2 may also be set to "1".

If the initial address value ADDini is periodically updated, stability of the stored compensation data CD can be further secured even in the case where an abnormal end of the operation of the display device is repeated. This will be described in more detail with reference to FIG. 7.

Figure 7:
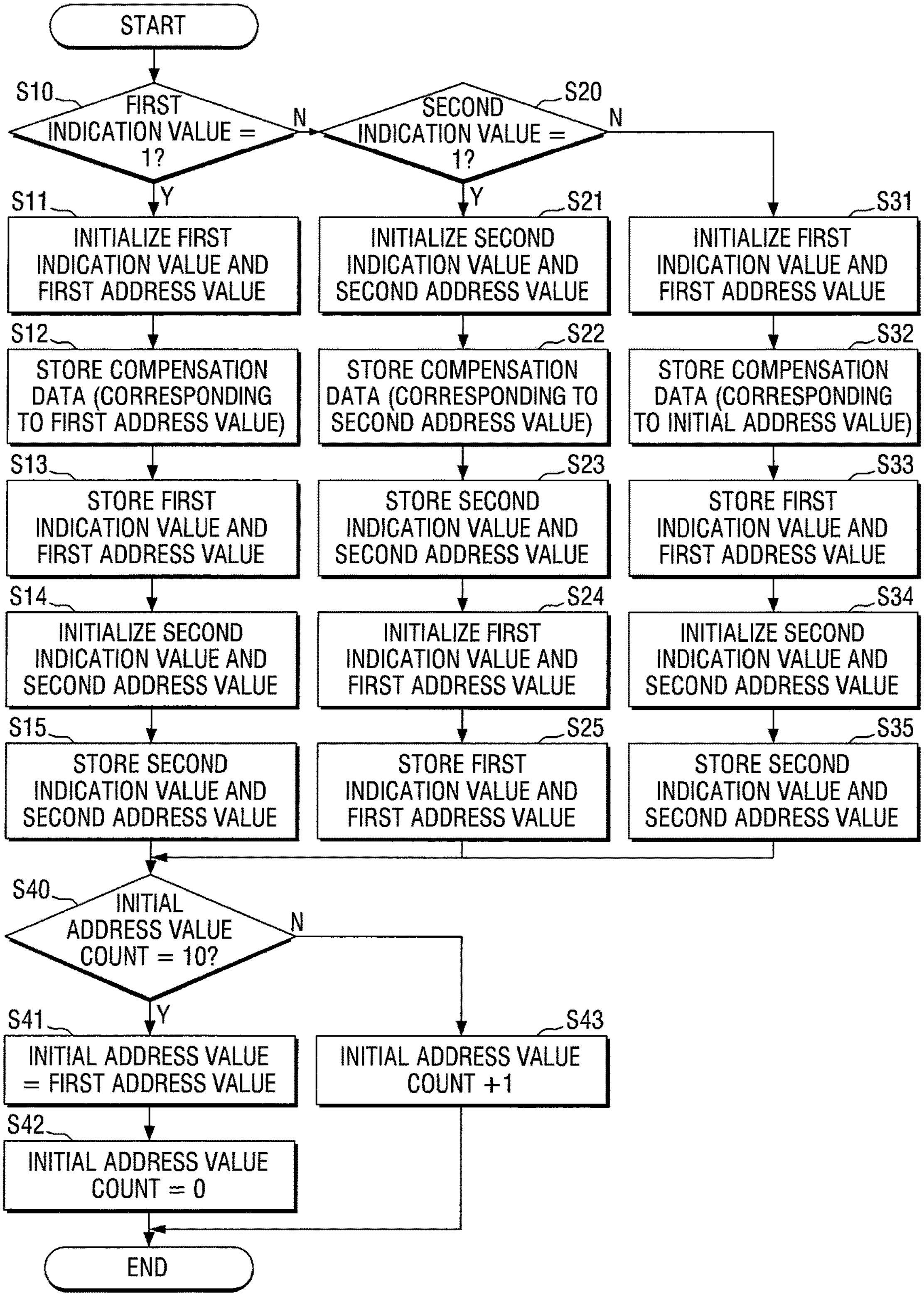
FIG. 7 is a flowchart of a data storage method according to another embodiment of the present invention.

FIG. 7 is a flowchart of a data storage method according to another embodiment of the present invention.

Since some of the constituent elements, except for portions that are differently illustrated in FIG. 7, are the same or substantially the same as those described above with reference to FIG. 6, the duplicate description thereof will be omitted.

Referring to FIG. 7, unlike that illustrated in FIG. 6, the data storage method may further include operations for updating the initial address value ADDini (S40 to S43) after updating the first and second indication values FLD1 and FLD2, the first and second address values ADD1 and ADD2, and the compensation data CD.

Specifically, a separate counter value of the initial address value ADDini may be used. This may be stored in the memory unit 630 or may be stored in another place. FIG. 6 exemplarily illustrates that the counter value of the initialization address value ADDini is re-initialized on the basis of a value of 10, but the present invention is not limited thereto. For example, various suitable values may be set as the counter value. If the counter value of the initial address value ADDini is set to 10, the initial address value ADDini is updated whenever the compensation data CD for 10 blocks is stored.

If it is confirmed (S40) that the counter value of the initial address value ADDini has not reached 10, the counter value of the initial address value ADDini may be increased by 1 (S43). In this case, the value that is stored as the initial address value ADDini may be equally maintained.

On the other hand, if it is confirmed (S40) that the counter value of the initial address value ADDini is equal to 10, the value that is currently stored as the first address value ADD1 may be set as the initial address value ADDini. If processing of the initial address value ADDini is performed without interruption midway, the value that is stored as the first address value ADD1 may be effective. After the initial address value ADDini is set to the value that is stored as the first address value ADD1 (S41), the counter value of the initial address value ADDini may be set to "0" (S42), but the present invention is not limited thereto. For example, the order of setting the initial address value ADDini to the first address value ADD1 (S41) and setting the counter value of the initial address value ADDini to "0" (S42) may be changed, or the settings (S41 and S42) may be concurrently (e.g., simultaneously) performed.

Figure 8:
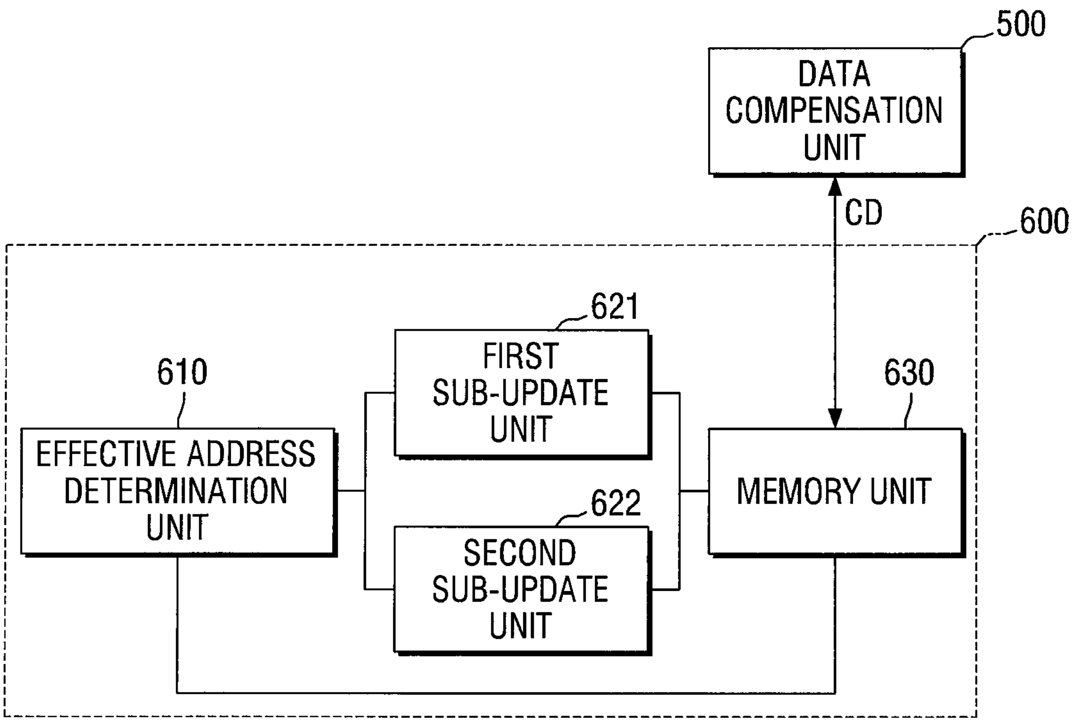
FIG. 8 is a block diagram of a data storage unit according to another embodiment of the present invention.

FIG. 8 is a block diagram of a data storage unit according to another embodiment of the present invention.

Since some of the constituent elements, except for portions that are differently illustrated in FIG. 8, are the same or substantially the same as those described above with reference to FIG. 4, the duplicate description thereof may be omitted.

Referring to FIG. 8, unlike in FIG. 4, the update unit 620 may include a first sub-update unit (e.g., a first sub-updater) 621 and a second sub-update unit (e.g., a second sub-updater) 622.

The first sub-update unit 621 may update the compensation data CD, and the second sub-update unit 622 may update the first and second indication values FLD1 and FLD2 and the first and second address values ADD1 and ADD2. The first sub-update unit 621 and the second sub-update unit 622 may be arranged in different processing regions in physically the same unit, or may be arranged in physically different units.

This is because, as described above, the compensation data CD that is controlled by the first sub-update unit 621 may be accumulated and stored, but the first and second indication values FLD1 and FLD2 and the first and second address values ADD1 and ADD2 that are controlled by the second sub-update unit 622 may not be accumulated and stored, of which properties may be different from each other.

Figure 9:
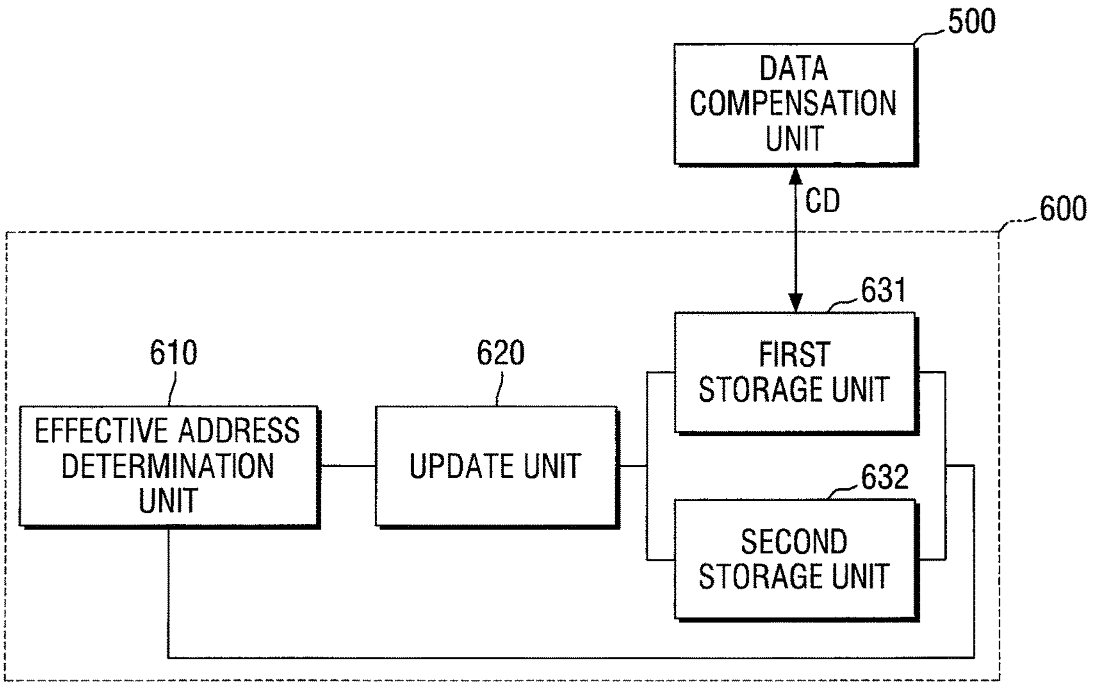
FIG. 9 is a block diagram of a data storage unit according to still another embodiment of the present invention.

FIG. 9 is a block diagram of a data storage unit according to still another embodiment of the present invention.

Since some of the constituent elements, except for portions that are differently illustrated in FIG. 9, are the same or substantially the same as those described above with reference to FIG. 4, the duplicate description thereof will be omitted.

Referring to FIG. 9, unlike in FIG. 4, the memory unit 630 may include a first storage unit (e.g., a first storage device) 631 and a second storage unit (e.g., a second storage device) 632.

The first storage unit 631 may store the compensation data CD, and the second storage unit 632 may store the first and second indication values FLD1 and FLD2 and the first and second address values ADD1 and ADD2.

Further, the first storage unit 631 and the second storage unit 632 may correspond to nonvolatile storage devices that are physically separated from each other.

This is because, as described above, the compensation data CD that is stored in the first storage unit 631 may be accumulated and stored, but the first and second indication values FLD1 and FLD2 and the first and second address values ADD1 and ADD2 that are stored in the second storage unit 632 may not be accumulated and stored, and thus, the first storage unit 631 may utilize larger capacity than the capacity of the second storage unit 632.

FIG. 10 is a table showing first to third indication values and an effective address value determined accordingly according to some embodiments of the present invention.

Since some of the constituent elements, except for portions that are differently illustrated in FIG. 10, are the same or substantially the same as those described above with reference to FIG. 5, the duplicate description thereof will be omitted.

Referring to FIG. 10, unlike in FIG. 5, the table may further include a third address value ADD3 and a third indication value FLD3 for determining whether the third address value is effective.

If the third indication value FLD3 is "1", it may be determined that the third address value ADD3 is effective. However, as described above, since whether the first address value ADD1 and the second address value ADD2 are effective is first determined by the first indication value FLD1 and the second indication value FLD2, it may be determined that the third address value ADD3 is effective only in the case where both the first indication value FLD1 and the second indication value FLD2 are "0" and the third indication value FLD3 is "1".

Further, if all the first to third indication values FLD1 to FLD3 are "0", it may be determined that all the first to third address values ADD1 to ADD3 are not effective, and in this case, the initial address value ADDini may be determined as an effective address value.

Since the third indication value FLD3 and the third address value ADD3 are additionally included, the data storage device for a display device according to the present embodiment may further improve reliability of the compensation data CD being stored.

While the invention has been particularly shown and described with reference to exemplary embodiments thereof, it will be understood by those of ordinary skill in the art that various changes may be made therein without departing from the spirit and scope of the invention as defined by the following claims, and their equivalents. The exemplary embodiments should be considered in a descriptive sense only and not for purposes of limitation.

Although example embodiments of the present invention have been described for illustrative purposes, those skilled in the art will appreciate that various modifications, additions and substitutions are possible, without departing from the scope and spirit of the invention as disclosed in the accompanying claims, and their equivalents.

What is claimed is:

1. A data storage device to be coupled to a display device, the display device comprising a display unit comprising a plurality of blocks arranged in successive rows and columns, each of the blocks comprising a plurality of pixels, the data storage device comprising:

a memory device configured to store a first address value and a second address value including information on a position of one of the plurality of blocks, to store a first indication value to be utilized to determine whether the first address value is effective and a second indication value to be utilized to determine whether the second address value is effective, and to store compensation data including information on the blocks;

an effective address determinator configured to determine whether the first address value and the second address value are effective corresponding to the first indication value and the second indication value; and an updater configured to update the first and second indication values, the first and second address values, and the compensation data.

2. The data storage device of claim 1, wherein the effective address determinator is configured to:

determine that the first address value is effective when the first indication value has a first value;

determine that the second address value is effective when the first indication value has a second value and the second indication value has a third value; and determine that both the first and second address values are not effective when the first indication value has the second value and the second indication value has a fourth value.

3. The data storage device of claim 2, wherein the effective address determinator is configured to determine that a predetermined initial address value is effective when both the first and second address values are determined to be not effective.

4. The data storage device of claim 3, wherein the initial address value is configured to be updated during a predetermined period.

5. The data storage device of claim 2, wherein the updater is configured to set the first indication value to one of the first value and the second value, and to set the second indication value to one of the third value and the fourth value.

6. The data storage device of claim 5, wherein the first value is equal to the third value, and the second value is equal to the fourth value.

7. The data storage device of claim 1, wherein the memory device includes a nonvolatile memory.

8. The data storage device of claim 1, wherein the updater comprises:

a first sub-updater configured to update the compensation data; and a second sub-updater configured to update the first and second indication values and the first and second address values.

9. The data storage device of claim 1, wherein the memory device comprises:

a first storage device configured to store the compensation data; and a second storage device configured to store the first and second indication values and the first and second address values.

10. The data storage device of claim 9, wherein the first storage device comprises a memory that is physically separated from the second storage device.

11. The data storage device of claim 1, wherein the memory device is configured to update and store the first and second indication values and the first and second address values, and to accumulate and store the compensation data.

12. The data storage device of claim 11, wherein the updated first address value corresponds to a next block to a block that corresponds to a previous first address value, and the updated second address value corresponds to a next block to a block that corresponds to a previous second address value.

13. The data storage device of claim 12, wherein the updated first address value and the updated second address value correspond to a same block.

14. The data storage device of claim 1, wherein the memory device is further configured to store a third address value that includes information on a position of one of the plurality of blocks, and a third indication value to be utilized to determine whether the third address value is effective, and the effective address determinator is configured to determine whether the first, second, and third address values are effective corresponding to the first, second, and third indication values.

15. A data storage method for a display device, comprising:

determining whether a first address value or a second address value are effective corresponding to a first indication value and a second indication value, respectively, each of the first and second address values including information on a position of one of a plurality of blocks of pixels of the display device, the plurality of blocks being arranged in successive rows and columns;

in response to determining that the first address value is effective, updating the first indication value, the first address value, and compensation data of a corresponding block, and then updating the second indication value and the second address value; and in response to determining that the second address value is effective, updating the second indication value, the second address value, and compensation data of a corresponding block, and then updating the first indication value and the first address value.

16. The data storage method of claim 15, further comprising:

in response to determining that both the first address value and the second address value are not effective, updating the first indication value, the first address value, and compensation data of a block that corresponds to a predetermined initial address value, and then updating the second indication value and the second address value.

17. The data storage method of claim 16, further comprising updating the initial address value in a predetermined period.

18. The data storage method of claim 15, wherein the updating of the first indication value, the first address value, and the compensation data of the corresponding block, and then the updating of the second indication value and the second address value comprises:

initializing values stored as the first indication value and the first address value;

initializing the compensation data of the block that corresponds to the first address value;

storing updated compensation data of the block that corresponds to the first address value;

storing updated values as the first indication value and the first address value;

initializing values stored as the second indication value and the second address value; and storing updated values as the second indication value and the second address value.

19. The data storage method of claim 18, wherein the storing of the updated values as the first indication value and the first address value corresponds to a next block to the block that corresponds to the first address value before being updated, and the storing of the updated value as the second indication value and the second address value corresponds to a next block to the block that corresponds to the second address value before being updated.

20. The data storage method of claim 19, wherein the updated first address value and the updated second address value correspond to a same block.

* * * * *